United States Patent [19]
Perry

[11] 3,846,885
[45] Nov. 12, 1974

[54] VALVE WITH ELLIPTICAL SEALING

[76] Inventor: Dean A. Perry, 2235 W. 229th, Torrance, Calif. 90501

[22] Filed: Aug. 1, 1973

[21] Appl. No.: 384,453

Related U.S. Application Data

[62] Division of Ser. No. 246,765, April 24, 1972, Pat. No. 3,780,985.

[52] U.S. Cl.............................. 29/157.1 R, 29/434
[51] Int. Cl............................................. B21d 53/00
[58] Field of Search............... 29/157.1 R, 434, 441; 251/309, 311, 312, 315, 316, 333

[56] References Cited
UNITED STATES PATENTS

| | | | |
|---|---|---|---|
| 2,792,196 | 5/1957 | Clade.................................. | 251/315 |
| 3,036,600 | 5/1962 | Vickery............................... | 251/315 |
| 3,064,937 | 11/1962 | Pryor................................... | 251/315 |
| 3,082,992 | 3/1963 | Vickery............................... | 251/315 |
| 3,141,231 | 7/1964 | Davies et al. ........................ | 29/441 |
| 3,208,718 | 9/1965 | White .................................. | 251/315 |

FOREIGN PATENTS OR APPLICATIONS

| | | | |
|---|---|---|---|
| 338,248 | 3/1936 | Italy....................................... | 29/441 |
| 114,876 | 9/1945 | Sweden................................. | 251/316 |

Primary Examiner—C. W. Lanham
Assistant Examiner—Dan C. Crane
Attorney, Agent, or Firm—Harris, Kern, Wallen & Tinsley

[57] ABSTRACT

A plug or ball valve wherein either the rotary valve member, or its chamber in the valve body, is substantially elliptical in a plane perpendicular to the axis of rotation, with the axes of the ellipse so oriented that the clearances between the surface of the valve member and the surface of the valve chamber are a minimum around the ports in the valve body in the closed position of the valve member, and are a maximum intermediate the ports in the valve body in the closed position of the valve member. With this construction, maximum sealing effectiveness in the closed position of the valve member is achieved, along with other advantages, such as reducing the torque required to rotate the valve member.

2 Claims, 9 Drawing Figures

PATENTED NOV 12 1974 3,846,885

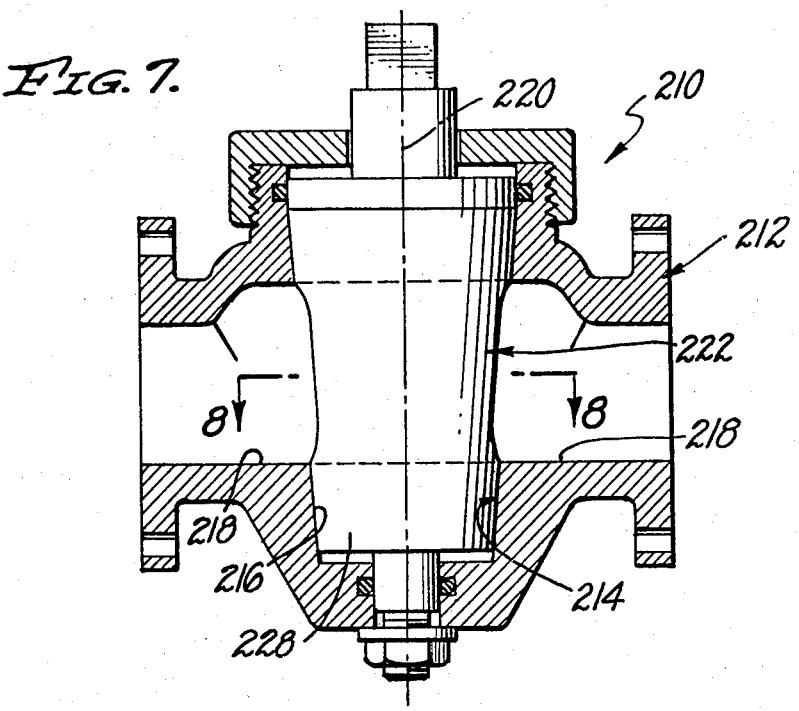
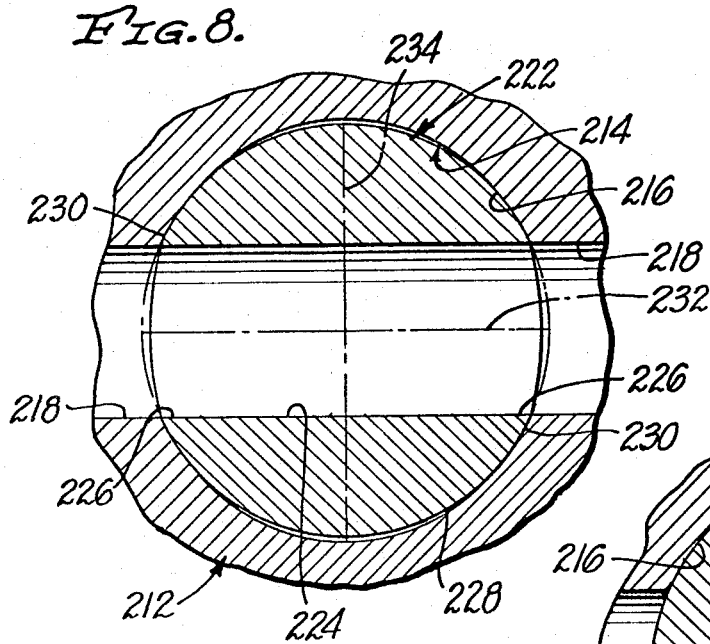
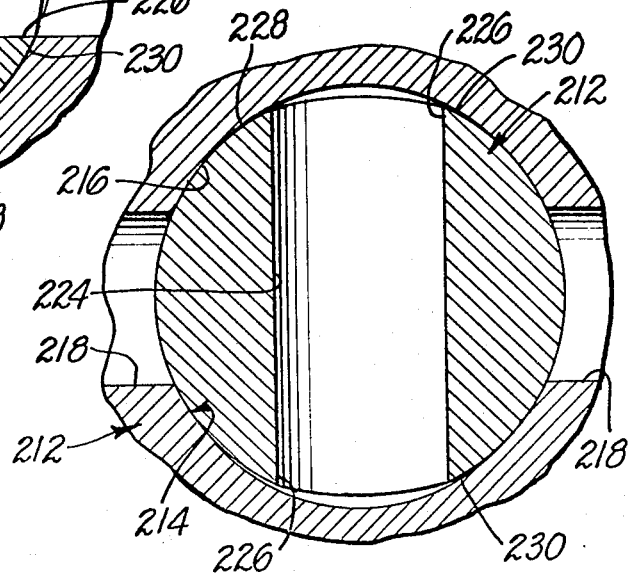

VALVE WITH ELLIPTICAL SEALING

This is a division of application Ser. No. 246,765, filed Apr. 24, 1972, now U.S. Pat. No. 3,780,985.

BACKGROUND OF INVENTION

The present invention relates to a rotary valve and, more particularly, to a plug or ball valve, the plug valve being of either the cylindrical or tapered types.

Still more particularly, the invention relates to a sealing means for plug and ball valves.

In valves of the character under consideration herein, the rotary valve member, whether plug or ball, is deflected toward the low pressure port in the valve body by the fluid pressure in the high pressure port. This deflection of the valve member insures a positive seal around the low pressure port in the valve body.

If highly resilient seals are present around both ports in the valve body when the valve member is in its closed position, the expansion of the seal around the high pressure port will maintain a positive seal. However, if metal seals, or slow recovery seals, such as Teflon, nylon, or the like, are used, leakage frequently cannot be prevented on the high pressure side, even though a fluid tight seal is obtained on the low pressure side. In applications requiring sealing in both directions, such directional sealing cannot be tolerated. Directional sealing may, for example, result in such things as contamination of the line fluid, unsatisfactory valve performance, and the like.

In tapered plug valves, it is common to eliminate separate seals around the ports in the valve body in the closed position of the valve member, utilizing instead metal-to-metal contact between the valve member and the surface of its chamber in the valve body. With this construction, leakage on both the low and high pressure sides can be prevented by seating the tapered valve member more firmly in its tapered chamber. However, this greatly increases the torque required to rotate the plug.

The foregoing and various other disadvantages of conventionally sealed plug and ball valves are avoided by the present invention in the manner hereinafter discussed.

SUMMARY AND OBJECTS OF INVENTION

With the foregoing background in mind, a primary object of the present invention is to prevent or minimize the effects of deflection of the valve member toward the low pressure side of the valve body.

More particularly, an important object is to provide a construction wherein the clearances between the unported portions of the valve member and the ported portions of its chamber in the valve body are minimized, in the closed position of the valve member, while providing substantial clearances between the valve member and the unported portions of the valve chamber when the valve member is in its closed position.

Expressed more specifically, an important object of the invention is to provide a construction wherein the peripheral surface of either the valve member, or its chamber in the valve body is substantially elliptical in a plane perpendicular to the axis of rotation with the axes of the ellipse so oriented that the clearances between the surface of the valve member and the surface of the valve chamber are a minimum around the ports in the valve body in the closed position of the valve member, and are a maximum intermediate the ports in the valve body in the closed position of the valve member.

With the foregoing construction, any seals around the ports in the valve body are biased into engagement with the surfaces of the valve member and the valve chamber with a maximum force in the closed position of the valve member, and with reduced force in the open position. Consequently, positive seals are obtained on both the low pressure and the high pressure sides in the closed position of the valve member, while reducing the torque required to rotate the valve member.

As previously indicated, either the surface of the valve chamber, or the surface of the valve member, may be substantially elliptical in a plane perpendicular to the axis of rotation. In the case of the valve chamber surface, the minor axis of the ellipse extends between the ports in the valve body. In the case of the valve member surface, the minor axis of the ellipse extends between the ports in the valve member.

The invention may be summarized generally as a valve which includes: a valve body provided therein with a valve chamber having an axis of rotation and having an internal peripheral surface provided with alternate ported and unported portions spaced apart about the axis of rotation; the valve body having ports in the ported portions of the valve chamber which communicate with the valve chamber; a valve member rotatable in the valve chamber about the axis of rotation and having an external peripheral surface provided with alternate ported and unported portions spaced apart about the axis of rotation; the valve member having ports in the ported portions thereof and having a passage interconnecting the ports therein; the valve member having an open position wherein the ports in the valve member register with the ports in the valve body and the unported portions of the valve member register with the unported portions of the valve chamber; the valve member having a closed position wherein the ports in the valve member register with the unported portions of the valve chamber and the unported portions of the valve member register with the ports in the valve body; there being relatively large clearances between the ported portions of the valve member and the unported portions of the valve chamber in the closed position of the valve member; and there being relatively small clearances between the unported portions of the valve member and the ported portions of the valve chamber in the closed position of the valve member.

The invention may be summarized more specifically as a valve which includes: a valve body provided therein with a valve chamber having an axis of rotation and having an internal, peripheral, valve chamber surface provided with opposed ports spaced apart about the axis of rotation by substantially 180°; a valve member rotatable in the valve chamber about the axis of rotation and having an external, peripheral, valve member surface provided with opposed ports spaced apart about the axis of rotation by substantially 180° and interconnected by a passage through the valve member; the valve member having an open position wherein the ports in the valve member are out of register with the ports in the valve body; and one of the peripheral surfaces being substantially elliptical in a plane perpendicular to the axis of rotation with the axes of the ellipse so oriented that the clearances between the valve member surface and the valve chamber surface are a minimum around the ports in the valve body in the closed position of the valve member, and are a maximum around the ports in the valve member in the closed position of the valve member.

The foregoing objects, advantages, features and results of the present invention, together with various other objects, advantages, features and results thereof which will be evident to those skilled in the ball or plug sealing art in the light of this disclosure, may be achieved with the exemplary embodiments of the invention illustrated in the accompanying drawings and described in detail hereinafter.

DESCRIPTION OF DRAWINGS:

In the drawings:

FIG. 7 is a sectional view of a tapered plug valve embodying the invention, FIG. 7 being taken in a plane containing the axis of rotation of the valve plug; and FIGS. 8 and 9 are fragmentary sectional views taken as indicated by the arrowed line 8—8 of FIG. 7 and respectively showing the valve plug in its open and closed positions.

DESCRIPTION OF EXEMPLARY EMBODIMENT OF INVENTION, FIGS. 1 TO 3

Figure 1:
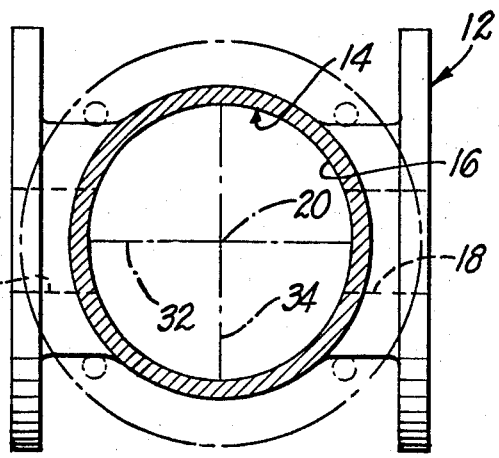
FIG. 1 is a sectional view of a valve body of the invention, in a plane perpendicular to the axis of rotation of a valve member to be inserted therein.
Figure 2:
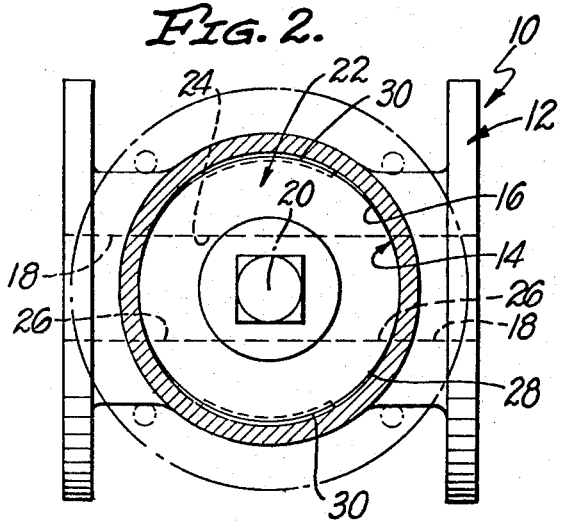
FIGS. 2 and 3 are views similar to FIG. 1, but showing a valve member in the valve body, the valve member being in its open position in FIG. 2 and in its closed position in FIG. 3.
Figure 3:
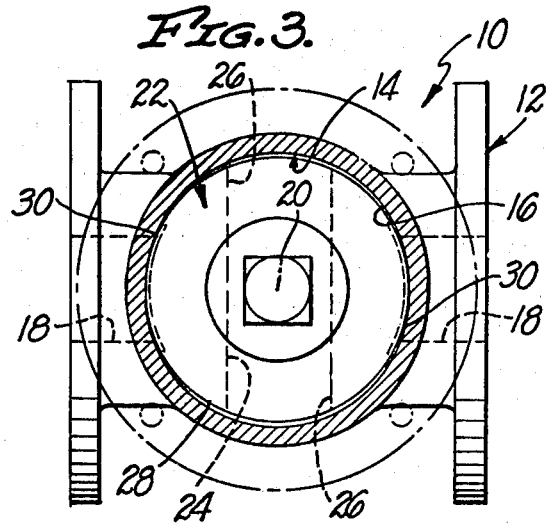

Illustrated in FIGS. 1 to 3 of the drawings is a plug valve 10 which includes a valve body 12 provided therein with a valve chamber 14 having an internal peripheral surface 16, the valve body having aligned ports 18 extending through the peripheral surface 16.

Rotatable in the valve chamber 14 about an axis 20 is a valve member 22 in the form of a cylindrical plug. This plug is provided therethrough with a diametral passage 24 terminating at its ends in ports 26 in an external peripheral surface 28 of the plug. The unported portions of the peripheral surface 28 are provided intermediate the ports 26 with annular grooves containing annular seals 30 which encircle the ports 18 in the valve body 12 in the closed position of the valve 10, FIG. 3. The open position of the valve 10 is shown in FIG. 2.

The peripheral surface 16 of the valve chamber 14 is substantially elliptical in a plane perpendicular to the axis of rotation 20, with the minor axis 32 of the ellipse extending between the ports 18 and the major axis 34 extending between unported portions of the peripheral surface 16 intermediate the ports 18. This elliptical configuration may be accorded the peripheral surface 16 of the valve chamber 14 by compressing the valve body 12 slightly in the direction of the minor axis 32 to distort the peripheral surface 16. Alternatively, the desired substantially elliptical configuration may be accorded the peripheral surface 16 in other ways.

The length of the major axis 34 exceeds that of the minor axis 32 in the range of approximately 0.005 inch to 0.010 inch. With this construction, in the closed position of the valve 10, the clearances between the valve member surface 28 and the valve body surface 16 are a maximum around the ports 26 in the valve member 22, and are a minimum around the ports 18 in the valve body 12, as shown in FIG. 3.

Consequently, when the valve 10 is closed, the seals 30 are subjected to maximum compression around the ports 18 in the valve body 12. This insures positive sealing around the valve body ports 18 on both the high pressure and the low pressure sides, despite deflection of the plug 22 toward the low pressure side by the fluid pressure in the port 18 at the higher pressure. Further, since maximum forces are applied between the valve chamber and valve member surfaces 16 and 18 only when the seals 30 are in the vicinities of the valve body ports 18, the torque necessary to rotate the plug 22 between its closed and open positions is minimized.

Thus, the valve 10 of the invention achieves the important objectives of positive seals on both the high pressure and low pressure sides, combined with low torque operation. It will further be noted that since the seals 30 are forced against the valve body surface 16 with maximum pressure only in the vicinities of the valve body ports 18, positive high pressure and low pressure seals are achieved even with metallic or slow recovery non-metallic seals.

Figure 6:
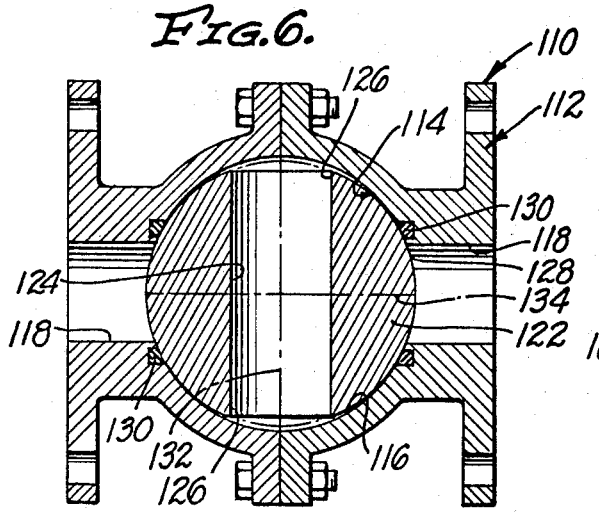
FIG. 6 is a view taken as indicated by the arrowed line 6—6 of FIG. 5.
Figure 4:
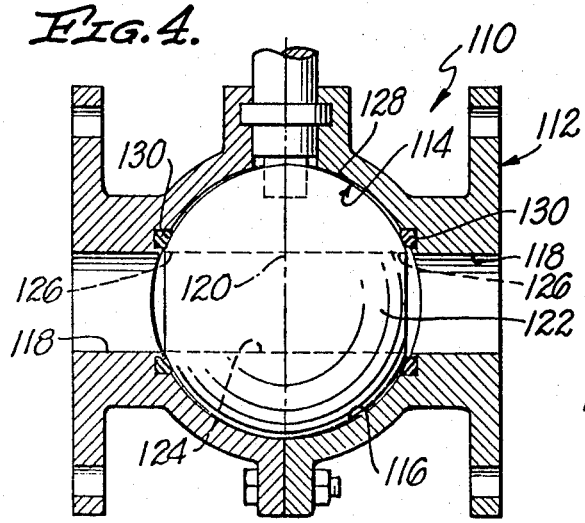
FIGS. 4 and 5 are sectional views of a ball valve of the invention with the valve member in its open and closed positions, respectively, FIGS. 4 and 5 being taken in a plane containing the axis of rotation of the valve member.
Figure 5:
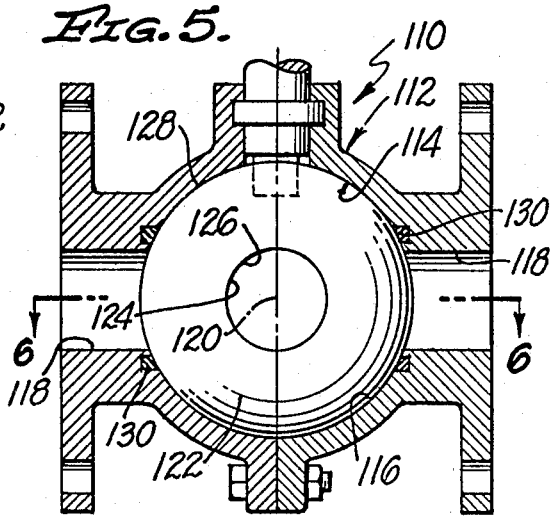

FIGS. 4 to 6

These figures illustrate a ball valve 110 which also utilizes elliptical sealing. The ball valve 110 is very similar to the plug valve 10. Consequently, the parts of the ball valve will be identified by reference numerals higher by 100 than those utilized to identify corresponding parts of the plug valve 10.

One minor difference between the ball valve 110 and the plug valve 10 is that the ball valve is equipped with seals 130 in grooves around the ports 118 in the valve body 112. However, the seals 130 could be located on the ball 122 in positions similar to the seals 30 on the plug 22.

The major difference between the ball valve 110 and the plug valve 10, aside from the different configurations of the valve body 112 and the ball 122, is that the ball 122 is substantially elliptical in a plane perpendicular to the axis of rotation, as shown in FIG. 6. (The ball 122 is also substantially elliptical in a plane containing the axis of rotation, as shown in FIG. 4.)

The minor axis 132, FIG. 6, of the substantially elliptical ball 122 extends in the direction of the ports 126 in the ball 122. Consequently, when the ball valve 110 is closed, as shown in FIG. 6, the clearances between the valve member surface 128 and the valve chamber surface 116 are a maximum around the ports 126 in the ball 122, and are a minimum around the ports 118 in the valve body 112. Consequently, maximum pressures are applied to the seals 130, in much the same way as the seals 30 of the plug valve 10. Thus, positive sealing on both the high and low pressure sides is achieved, as in the case of the plug valve 10. Again as in the case of the plug valve 10, the torque required to rotate the ball 122 is minimized.

FIGS. 7 to 9

Illustrated in these figures of the drawings is a tapered plug valve 210 which is similar to the ball valve 110 and the cylindrical plug valve 10. Consequently, the various parts of the valve 210 will be identified by reference numerals higher by 200 than those utilized for corresponding components of the valve 10.

The tapered plug valve 210 is similar to the cylindrical plug valve 10 in that the valve chamber 214 is substantially elliptical, while the tapered plug 222 is circular in cross section in planes perpendicular to the axis of rotation 220. The minor and major axes 232 and 234 of the valve chamber 214 have the same orientations as the minor and major axes 32 and 34 of the valve chamber 14.

Instead of seals 30, the tapered plug 222 is provided with lapped surfaces 230 which sealingly engage complementary lapped surfaces around the ports 218 in the valve body 212. Positive seals can be obtained on both the high and low pressure sides without excessively firm seating of the tapered plug 222 in its tapered chamber 214. This, coupled with the clearances which exist between large portions of the tapered plug 222 and the valve chamber surface 216, minimize the torque required to rotate the tapered plug.

Although exemplary embodiments of the invention have been disclosed for purposes of illustration, it will be understood that various changes, modifications and substitutions may be incorporated in such embodiments without departing from the spirit of the invention as defined by the claims appearing hereinafter.

I claim:

1. A method of making a rotary valve including a valve body having a valve chamber of substantially elliptical cross section, comprising the steps of:
   a. providing a valve body including therein a valve chamber having an axis of rotation and having an internal, peripheral, valve chamber surface which is initially circular in cross section in a plane perpendicular to said axis of rotation and which is provided therein with opposed ports spaced apart along a port axis perpendicular to and intersecting said axis of rotation and spaced apart about said axis of rotation by 180°; and
   b. compressing said valve body in the direction of said port axis until said valve chamber surface is permanently distorted into a substantially elliptical cross section in a plane perpendicular to said axis of rotation with the minor axis of the ellipse coinciding with said port axis.

2. A method according to claim 1 including the additional step of installing in said valve chamber a rotary valve member rotatable about said axis of rotation and circular in cross section in a plane perpendicular to said axis of rotation and having a passage therethrough the ends of which are registerable with said ports, respectively.

* * * * *